US006717132B2

(12) United States Patent
Franzen

(10) Patent No.: US 6,717,132 B2
(45) Date of Patent: Apr. 6, 2004

(54) GRIDLESS TIME-OF-FLIGHT MASS SPECTROMETER FOR ORTHOGONAL ION INJECTION

(75) Inventor: Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 223 days.

(21) Appl. No.: 09/778,654

(22) Filed: Feb. 7, 2001

(65) Prior Publication Data

US 2001/0011703 A1 Aug. 9, 2001

(30) Foreign Application Priority Data

Feb. 9, 2000 (DE) ........................................ 100 05 698

(51) Int. Cl.[7] ......................... B01D 59/44; H01J 49/00; H01J 49/40

(52) U.S. Cl. ....................... 250/287; 250/286; 250/281; 250/282; 250/283; 250/288; 250/290; 250/292

(58) Field of Search ................................ 250/281, 282, 250/283, 286, 287, 288, 290, 292

(56) References Cited

U.S. PATENT DOCUMENTS

| | | | | | |
|---|---|---|---|---|---|
| 4,472,631 | A | | 9/1984 | Enke et al. | |
| 4,731,532 | A | | 3/1988 | Frey et al. | |
| 4,894,536 | A | * | 1/1990 | Conzemius | 250/287 |
| 5,065,018 | A | * | 11/1991 | Bechtold et al. | 250/287 |
| 5,160,840 | A | * | 11/1992 | Vestal | 250/287 |
| 5,382,793 | A | * | 1/1995 | Weinberger et al. | 250/288 |
| 5,614,711 | A | * | 3/1997 | Li et al. | 250/287 |
| 5,689,111 | A | * | 11/1997 | Dresch et al. | 250/287 |
| 5,734,161 | A | * | 3/1998 | Koster | 250/287 |
| 5,742,049 | A | | 4/1998 | Holle et al. | |
| 5,869,829 | A | | 2/1999 | Dresch | |
| 5,955,730 | A | * | 9/1999 | Kerley et al. | 250/287 |
| 5,969,348 | A | * | 10/1999 | Franzen | 250/282 |
| 5,986,258 | A | | 11/1999 | Park | |
| 6,229,142 | B1 | * | 5/2001 | Bateman et al. | 250/287 |
| 6,373,052 | B1 | * | 4/2002 | Hoyes et al. | 250/287 |
| 6,437,325 | B1 | * | 8/2002 | Reilly et al. | 250/252.1 |
| 6,469,295 | B1 | * | 10/2002 | Park | 250/282 |

FOREIGN PATENT DOCUMENTS

| | | |
|---|---|---|
| DE | 3025764 | 8/1980 |
| GB | 2274197 | 7/1994 |
| GB | 731558 | 12/1997 |
| WO | 97/48120 | 6/1996 |

OTHER PUBLICATIONS

Wollnik, H. et al., "Time–of–Flight Mass Spectrometers With Multiply Reflected Ion Trajectories", International Journal of Mass Spectrometry and Ion Processes, 1990,. 267–274, Elsevier Science Publishers B.V., The Netherlands.

* cited by examiner

*Primary Examiner*—John R. Lee
*Assistant Examiner*—Mary El-Shammaa

(57) ABSTRACT

The invention relates to a time-of-flight mass spectrometer for injection of the ions orthogonally to the time-resolving axis-of-flight component, with a pulser for acceleration of the ions of the beam in the axis-of-flight direction, preferably with a velocity-focusing reflector for reflecting the ion beam and with a flat detector at the end of the flight section. The invention consists of using, both for acceleration in the pulser and for reflection in the reflectors, a gridless optical system made up of slit diaphragms which can spatially focus the ions onto the detector in the direction vertical to the directions of injection and flight axis, but which does not have any focusing or deflecting effect on the other directions. For some reflector geometries it is essential to use an additional cylindrical lens for focusing, and for other reflector geometries the use of such a lens may be advantageous.

9 Claims, 2 Drawing Sheets

GRIDLESS TIME-OF-FLIGHT MASS SPECTROMETER FOR ORTHOGONAL ION INJECTION

The invention relates to a time-of-flight mass spectrometer for injection of the ions orthogonally to the time-resolving axis-of-flight component, with a pulser for acceleration of the ions of the beam in the axis-of-flight direction, preferredly with a velocity-focusing reflector for reflecting the ion beam and with a flat detector at the end of the flight section.

The invention consists of using, both for acceleration in the pulser and for reflection in the reflectors, a gridless optical system made up of slit diaphragms which can spatially focus the ions onto the detector in the direction vertical to the directions of injection and flight axis, but which does not have any focusing or deflecting effect on the other directions. For some reflector geometries it is essential to use an additional cylindrical lens for focusing, and for other reflector geometries the use of such a lens may be advantageous.

PRIOR ART

Time-of-flight mass spectrometers, which have been known for over 50 years now, have seen a dramatic comeback over roughly the last ten years. On the one hand, these devices can be used advantageously for new types of ionization with which large biomolecules can be ionized, and on the other hand the development of fast electronics for digitizing the temporally fast-changing ion beam in the detector has made it possible to construct high-resolution apparatuses. Nowadays analog/digital converters with a dynamic range of 8 bits and a data conversion rate of up to 4 gigahertz are available, and for measuring individual ions there are time/digital converters available with temporal resolutions in the picosecond range.

Time-of-flight mass spectrometers are frequently abbreviated to TOF or TOF-MS ("Time-Of-Flight Mass Spectrometer").

Two different types of time-of-flight mass spectrometer have been developed. The first type comprises time-of-flight mass spectrometers for measuring ions generated as ion cloud pulses in flight direction. An example for this is the generation of ions by matrix-assisted laser de-sorption, abbreviated to MALDI, a method of ionization suitable for ionizing large molecules. The second type consists of mass spectrometers for continuous injection of an ion beam, from which a section is then outpulsed in a "pulser" at right angles to the direction of injection and is caused to fly through the mass spectrometer in the form of a band-shaped ion beam consisting of linear ion beam segments. This second type is abbreviated to "Orthogonal Time-Of-Flight Mass Spectrometer" (OTOF); it is chiefly used in conjunction with continuous ion generation, for example electrospray (ESI). Due to the very high number of pulsed processes per unit of time (up to 50,000 pulses per second) a high number of spectra, each with a low number of ions, is generated in order to exploit the ions of the continuous beam as efficiently as possible. Electrospray is also suitable for the ionization of large molecules.

For measurement of the mass of large molecules by mass spectrometry, as particularly occurs in biochemistry, there is no spectrometer which is better than a time-of-flight mass spectrometer because of the limited mass ranges of other mass spectrometers.

Pulsed ion beams with ion cloud pulses originating from small sample spots, on the one hand, and band-shaped ion beams on the other, call for different ion optical systems for further focusing and guidance through the time-of-flight mass spectrometer: this is the reason for developing different types of mass spectrometer for these different types of ion injection.

In the simplest case of a TOF mass spectrometer, the ions are not focused at all. Acceleration of the ions generated by MALDI or ESI is performed by one or two grids, and the slight divergence of the ion beam caused by the initial velocities of the ions perpendicular to the direction of acceleration is accepted as being tolerable. The reflector also contains grids, one or even two grids depending on the type of reflector. In addition to beam divergence due to the spread of initial velocities there is a beam divergence caused by the small-angle scatter at the openings of the grid. If the electric field strength Is different on both sides of the grid, each opening in the grid will act as a weak ion lens. Divergence due to the spread of initial velocities can be reduced by selecting a high acceleration voltage but the small-angle scatter at the openings in the grid cannot be reduced. This small-angle scatter can only be reduced by making nets of finer mesh, albeit at the expense of grid transparency. Beam divergence creates a larger beam cross-section at the location of the detector, which necessitates a large-area detector. This large-area detector has disadvantages: a high level of noise and the necessity of very good two-dimensional directional adjustment in order to keep the flight path differences well below one micrometer.

For an optical system with two acceleration grids and one two-stage reflector with two grids, which each have to be transversed twice, there are already six grid passages. Even if the grids have a high level of transparency at 90%, which can only be achieved if the thickness of the grid wires is only about 5% of mesh size, total transparency is still only 48%. In addition there will be a non-negligible number of ions which are reflected by the grids and can be scattered back to the detector where they create background noise, which worsens signal-to-noise ratio.

The use of grids has therefore generally led to the use of single-stage reflectors. These must be much longer, about ⅓ of the total length of the spectrometer. The advantages of having only one grid (only two ion passages instead of four) and having to generate only one adjustable voltage are offset by considerable drawbacks: The mechanical design calls for many more diaphragms for homogenization of the reflection field; the long stay of the ions in the reflection field, however, leads to an increase in metastable decompositions in the reflector and therefore to diffused background noise in the spectrum because the decomposing ions turn back somewhere in the reflector due to changed energies so they cannot be temporally focused.

For the case of point-shaped ion origins (MALDI for example) gridless optical systems were therefore developed and introduced for acceleration of the ions (U.S. Pat. No. 5,742,049), particularly for their reflection in a two-stage reflector (EP 0 208 894). The gridless optical system consists of circular apertures which in principle represent spherical lenses. The ions from the point-shaped ion origin are therefore also imaged on a small-area detector (almost) in the shape of a point.

All the mass spectrometers known for orthogonal injection, however, have the very disadvantageous grids (due to the band-shaped ion beam which does not permit spherical lenses), both in the pulser and in the reflector.

OBJECTIVE OF THE INVENTION

It is the objective of the invention to find an accelerating and reflecting optical system for a time-of-flight mass spectrometer with orthogonal injection which operates without disadvantageous grids and focuses the ions on a small-area detector.

SUMMARY OF THE INVENTION

Throughout this text, we shall use the following nomenclature:

1) the original flight direction of the orthogonally injected ions defines the x-direction,
2) the direction in which the ions are pulsed by the pulser defines the y-direction,
3) the z-direction is defined to be perpendicular to the x- and y-direction. The three directions are orthogonal to each other; the y-direction is not completely identical with the flight path of the ions after being pulsed by the pulser.

The invention consists of using grid-free optical slit devices with long slits in the x-direction for the acceleration or deceleration of the in x-direction extended ion beam segments, both in the pulser and in the reflector (or in the reflectors if more than one is used), the optical slit devices being able to focus the band-shaped ion beam segments in the z-direction on a detector, which is narrow in the z-direction but long in the x-direction, if necessary with an additional cylindrical lens.

The slit diaphragms of the pulser, which accelerates the ions in the y-direction, act as slightly divergent cylindrical lenses in the z-direction so they create an ion beam which diverges slightly in the z-direction. If a Mamyrin two-stage reflector is used with a first strong deceleration field and a second weaker reflection field, the two being separated from the drift section and separated from one another by a grid-free passage gap extended in the x-direction, the reflector forms a (reflecting) cylindrical convergent lens in the z-direction, the focal length of which is determined by the slit widths and the ratio between deceleration field strength and reflection field strength. In the z-direction this cylindrical convergent lens can focus the slightly in the z-direction diverging ion beam from the pulser on the detector even without any additional cylindrical lens.

It is quite advantageous to use a two-stage Mamyrin reflector with a short deceleration field although it requires two supply voltages. The separation of deceleration field and reflector field permits an electrical adjustment of the velocity focusing exactly for the location of the detector; this makes mass resolution easier to adjust electrically without shortening the effective length of the flight. The crucial reduction in background noise has already been mentioned above.

For a single-stage reflector with only one slit diaphragm between the drift section and the reflection field at least one cylindrical lens must be added to be able to focus the ion beam on the detector in the z-direction because the single-stage reflector with slit diaphragms in the z-direction represents a cylindrical divergent lens.

Since the z-divergence of the ion beam leaving the pulser necessitates very wide slit diaphragms at the two-stage reflector, it is useful to install a cylindrical lens between the pulser and the reflector, making the ion beam narrower in the z-direction. The cylindrical lens can be a cylindrical Einzel lens. It is particularly advantageous to place the cylindrical lens close to the pulser and set it electrically so that an initial focusing in the z-direction is achieved between the pulser and the reflector. A focus line is formed, expanded linearly in the x-direction (almost perpendicular to the direction of flight) and located between the pulser and the reflector. This focus line is then focused, in the z-direction, onto the detector by the two-stage reflector. Another reason why installation of the cylindrical lens is particularly advantageous is that the ratio between deceleration field strength and reflection field strength in the reflector not only sets spatial z-focal length but also velocity focusing (and hence temporal focusing) at the detector, which takes absolute priority in achieving a high temporal resolution (and therefore mass resolving power). The cylindrical lens thus makes it possible to set the focusing length of the entire arrangement in the z-direction irrespective of velocity focusing.

A cylindrical Einzel lens consists of three slit diaphragms, the two outer ones of which are at the same potential, that is, the potential of the surroundings, and the inner slit diaphragm is at an adjustable lens potential, which determines the focal length of the lens. By making the potentials slightly different at the two jaws of the center slit diaphragm, the cylindrical Einzel lens can also be used to adjust the ion beam in the z-direction, in order to direct the band-shaped ion beam exactly into the center plane of the reflector.

It is advantageous to use a pulser with two slits and therefore two acceleration fields. That makes it possible to keep the voltage low at the first acceleration field which has to be pulsed: the voltage to be switched is only a small fraction of the total acceleration voltage. Pulsing has to take place at a rise time of a few nanoseconds and a low voltage facilitates the task of electronically developing such a pulser. A two-stage pulser can also bring about spatial or velocity focusing of the ions from the pulser.

The pulser and detector do not have to be positioned in the same x-z plane. Due to the electrical adjustability of the focal lengths of the cylindrical Einzel lens and the reflector, the detector can be positioned in a different x-z plane in front of or behind the pulser.

Finally the band-shaped ion beam segment can also be reflected a number of times in a zig-zag shape by more than one reflector with slit lenses before it hits the detector. The zig-zag deflection can take place in the x-y plane (FIG. 3) but also by slightly tilting the reflector round the longitudinal axis of the entrance slits in the x-z plane (FIG. 2). The latter can favorably be performed using a deflection capacitor, preferably an "extended Bradbury-Nielsen gate" in accordance with U.S. Pat. No. 5,986,258, which brings the direction of ion flight into the y-direction. By applying this deflection capacitor to deflect the beam into the y-direction the detector can then be positioned under or above the pulser.

PREFERRED EMBODIMENTS

Figure 1:
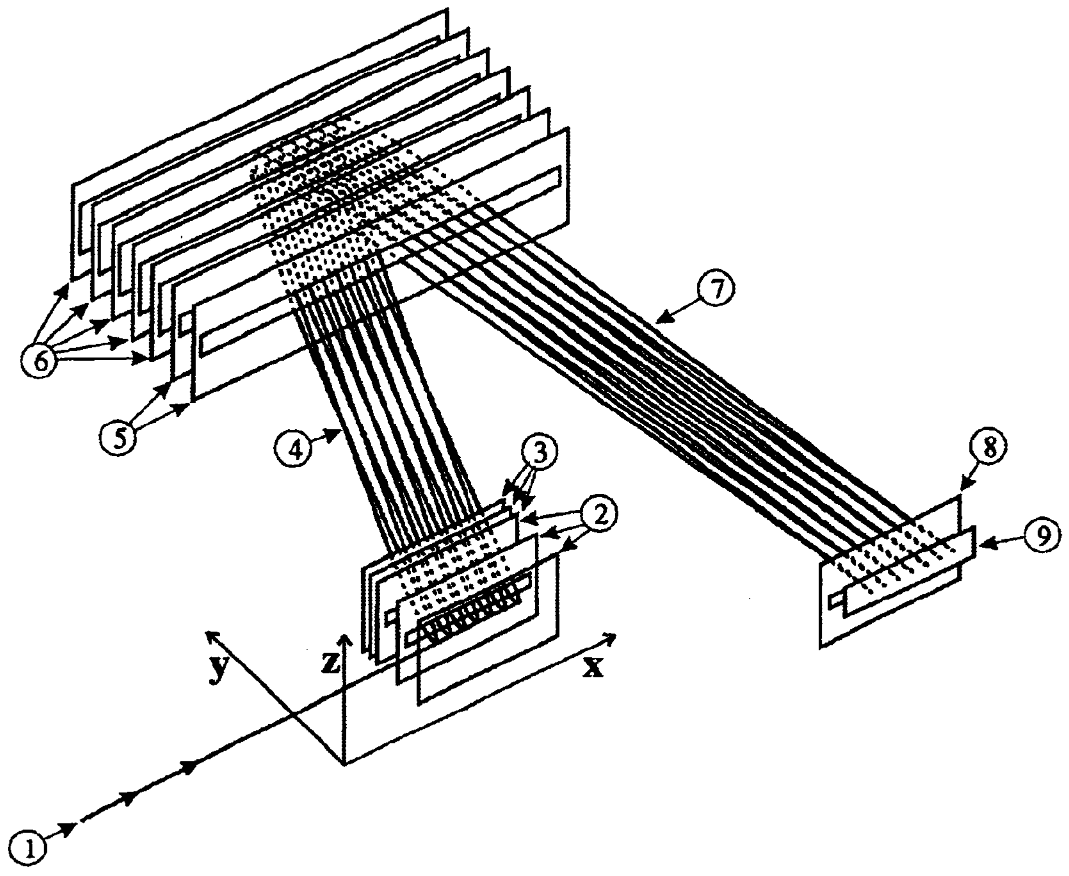
FIG. 1 shows a three-dimensional drawing of a preferred embodiment. The primary ion beam (1) is injected into a pulser (2) in the x-direction with a front repeller plate and two slit diaphragms. After filling the pulser a section of this ion beam is now accelerated in the y-direction, and thus pulsed out, by a short voltage pulse at the center slit diaphragm. The now band-shaped ion beam passes through a cylindrical Einzel lens (3) and is thus focused in the z-direction into a z-focus line (4). The direction of outpulsing does not coincide with the y-direction because the ions retain their velocity in the x-direction without any disturbance. The band-shaped ion beam enters the slit lenses (5) of a two-stage reflector on the other side of the z-focus line (4). Between the slit lenses (5) there is a strong deceleration field which decelerates most of the velocity of the ions. On the other side of the second slit lens there is the longer homogeneous reflection field which, as usual, consists of a series of diaphragms (6) for the linearization and homogenization of the field in the y-direction. In this reflection field the ions of the band-shaped ion beam turn back, pass through the now accelerating deceleration field between the slit diaphragms (5) and fly to the detector (9) as a band-shaped ion beam. The reflector acts in the z-direction as a convergent lens and focuses the ions in the z-direction on this detector (9) so that a detector which is narrow in the z-direction (9) can be used and also all the scattered ions can be masked out by a slit diaphragm (8) in front of that detector (9). With post-acceleration between the slit diaphragm (8) and the detector (9) a more sensitive ion detection can be achieved depending on the detector used, also with a better mass resolution, again depending on the detector used.

A preferred embodiment is depicted in FIG. 1. A fine primary ion beam (1), which defines the x-direction, is injected into the purser (2). The fine ion beam can originate from an electrospray ion source, for example. The pulser (2) consists of three electrodes, of which the first electrode acts as a repeller electrode and the second and third electrodes take the form of slit diaphragms. The ion beam consists of ions with low kinetic energy of approx. 4 to 40 electron-volts, which are injected into the space between the repeller electrode and the first slit diaphragm; the ions therefore fly relatively slowly, whereby the velocity depends on mass. (To be more accurate, the velocity depends on the ratio between the mass and the charge m/e, but for the sake of simplicity reference is only made to the mass m). While the pulser is being filled with ions the first two electrodes are at ambient potential so they do not disturb the flight of the ions. The third electrode is at acceleration potential, which, depending on the target of the mass spectrometer, is approx. 3 to 30 kilovolts. The polarity of the voltage depends on whether positive or negative ions are to be investigated.

The ion beam generally consists of a not very high number of different ionic types each with exactly the same mass m (or rather the same mass-to-charge ratio m/e). Very generally it is the aim of mass spectrometry to determine the relative numbers of ions of these ionic types and their precise masses.

Investigations using an orthogonal time-of-flight mass spectrometer are always restricted to a certain range of masses. When the heaviest ions to be examined have just filled the pulser, outpulsing is commenced. The second electrode is very quickly applied to an ion-attracting potential, which however only accounts for a small fraction of the full acceleration voltage. The rise time of that potential should only be a few nanoseconds. The repeller electrode may also be pulsed to an ion-repelling potential. The ions in the pulser are now accelerated perpendicular to their x-direction and leave the pulser through the slits in the slit diaphragms. The acceleration direction defines the y-direction. However, after their acceleration the ions move in a direction which is between the y-direction and the x-direction because they retain their original velocity in the x-direction undisturbed. (The angle with the y-direction is a $\alpha$=arcus tangens $\sqrt{(E_x/E_y)}$ where $E_x$ is the kinetic energy of the ions in the primary beam in the x-direction and $E_y$ is the energy of the ions after acceleration in the y-direction).

When the heaviest ions of the mass range of interest have left the pulser, the first two electrodes are switched back to ambient potential and the filling of the pulser from the continuously progressing primary beam recommences.

The ions which have left the pulser now form a wide band, whereby ions of the same type form a linear segment in the x-direction flying nearly in y-direction. Light ions fly faster, heavy ones slower, but they all fly in the same direction. The drift section of the time-of-flight mass spectrometer must be completely surrounded by the acceleration potential (not shown in FIG. 1 for reasons of simplicity) in order not to disturb the ions in their flight.

Alternatively, it is also possible to pulse the first two electrodes of the pulser (the repeller electrode and the first slit diaphragm) to a high voltage, whereby the voltages for the two electrodes differ, and to keep the third electrode at ground potential. The flight paths from the pulser to the reflector and between the reflector and the detector are then at ground potential. The detector has an entrance gap (8) which is also at ground potential. This arrangement is very favorable in some cases but it necessitates the common pulsing of two voltages to different high potentials.

Acceleration in conjunction with the slit lenses causes the ions of the ion beam emerging from the pulser to have a slight divergence in the z-direction perpendicular to the x- and y-directions, which is due to slight scatters of the transverse velocities and the flight locations of the ions in the primary beam. This divergence is slightly intensified by the optical system of the acceleration slits acting as lenses. It is therefore useful to transform the beam divergent in the z-direction to an ion beam convergent in the z-direction by using a cylindrical lens. In FIG. 1 this takes place by using a cylindrical Einzel lens (3), which consists of three slit diaphragms, the two outer ones of which being at ambient acceleration potential, while the inner electrode can be set to a different lens voltage. In the case of FIG. 1 the first slit diaphragm of the cylindrical Einzel lens is identical to the third pulser electrode so the package of pulser and cylindrical Einzel lens only comprises a total of five electrodes.

The setting of the lens voltage now generates an ion beam which is convergent in the z-direction and which has its z-focus at focal line (4). The focus is linear across the band-shaped ion beam so it is a line of focus. The focal length can be displaced by setting the lens voltage.

The band-shaped ion beam enters the two-stage reflector on the other side of the line of focus. This reflector initially comprises two slit diaphragms (5), between which there is a strong deceleration field due to suitably applied potentials. On the other side of the two slit lenses (5) there is the so-called reflection field which is homogenized by a series of diaphragms (6) with steadily decreasing voltages. In this reflection field the ions turn back. The field has a velocity-focusing effect on the ions of a single mass because faster ions penetrate the field somewhat further than slower ones and use up some time of flight due to their further penetration. In this way it is possible for the faster ions to catch up with the slower ions of the same mass exactly at the location of the detector: the result is velocity focusing. This velocity focusing leads to temporally compressed signals for the ions of a single mass, that is, to a higher temporal resolving power and to a higher mass resolution.

Such a two-stage reflector (5, 6) is created by a reflecting cylindrical convergent lens which can reflect the line of focus (4) into a line of focus at the location of the detector (9). Therefore the task of the invention is fulfilled. A small-area detector with low noise can be used. In front of the detector another slit diaphragm (8) can be introduced which keeps all the scattered ions no longer flying toward the z-focus away from the detector. (These scattered ions can be created by collisions with residual gas molecules, by monomolecular decomposition of metastable ions, or by ions reflected at some place).

The detector used is frequently a so-called multichannel plate which is a special design of electron multiplier. Since its sensitivity, particularly to heavy ions, depends on the energy of the ions, another post-acceleration of the ions can take place between the slit diaphragm (8) and the detector (9), without the now increased energy of the ions causing a reduction in the total time of flight and therefore mass resolution. Post-acceleration also improves the temporal resolving power of a multichannel plate.

When the heaviest ions of the investigated range of masses have arrived at the detector and have been measured, the pulser is also refilled; the next ion section of the primary ion beam can be outpulsed. Depending on the time of flight of the heaviest ions this procedure may be repeated between 10,000 and 50,000 times per second. The spectra are added up over a set scanning time, one second for example. At such a high number of repeats the mass of an ionic type can be measured precisely even if ions of that type occur only once in every 100 or 1,000 fillings of the pulser. Naturally one can also use the rapid scan sequence to measure ions from rapidly changing processes with a shorter scanning time, or from sharply substance-separating processes, for example, from capillary electrophoresis or microcolumn liquid chromatography.

If there are heavier ions in the primary ion beam (1) than correspond to the investigated range of masses, these ions may occur in the next spectrum as ghost peaks due to their slow flight. One must therefore ensure that such ions are removed from the primary ion beam. The specialist will be acquainted with various methods.

Figure 2:
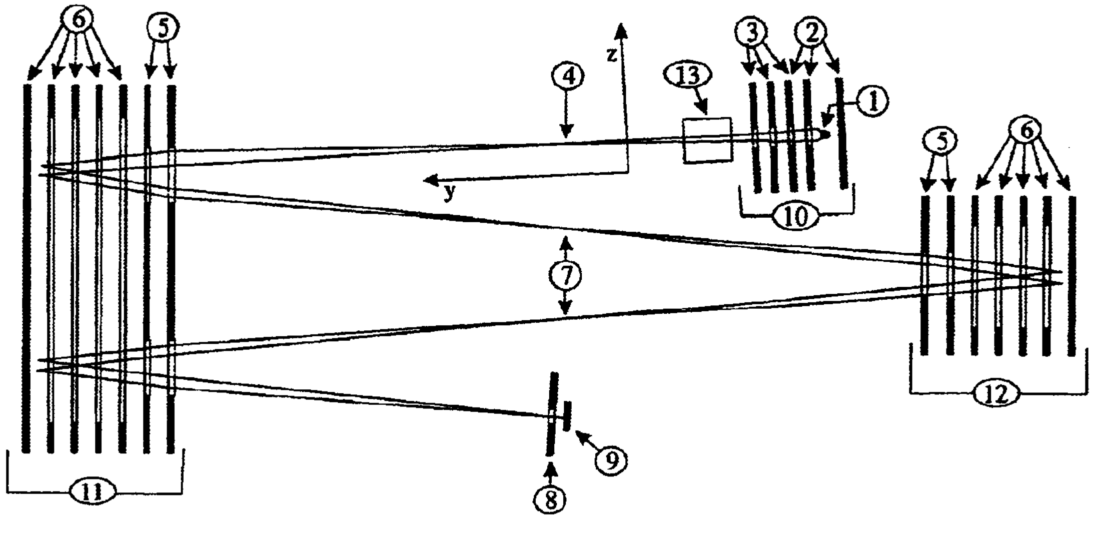
FIG. 2 depicts a band-shaped ion beam folded in a zig-zag in the y-z plane, which can be achieved by slightly turning the reflectors (11) and (12) and detector (9) relative to the arrangement (10) of purser (2) with lens (3). With an electrical capacitor in the x-direction (13) (advantageously an "extended Bradbury-Nielsen gate" consisting of several bipolar plates) the band-shaped ion beam can be brought precisely into the y-direction so that the convolutions (4, 7) of the band-shaped ion beam are exactly under one another. The other designation numbers are identical to those in FIG. 1. Such a convolution with grid arrangements for the pulser and reflectors can only be achieved under very unfavorable conditions because there are large numbers of grid passages and a considerable widening of the band-shaped ion beam in the z-direction. An analogous arrangement for point-shaped ion sources with several spherical, grid-free reflectors is described by Wollnik (DE 3 025 764 C2).
Figure 3:
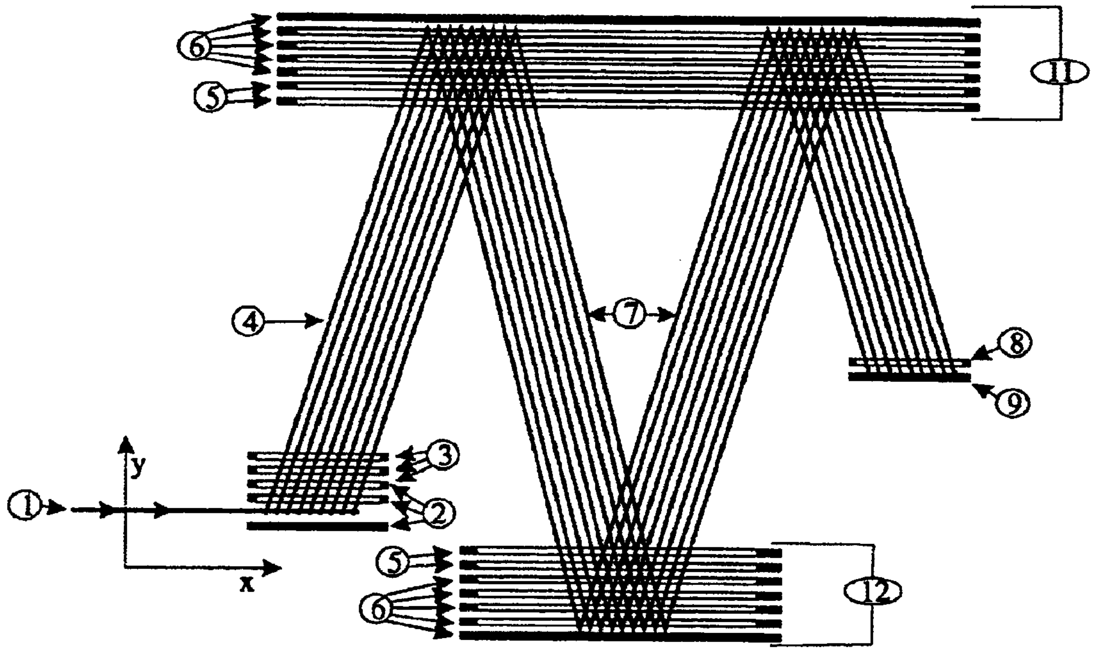
FIG. 3 shows a possible convolution of the band-shaped ion beam in the x-y plane. The designations are the same as in FIGS. 1 and 2.

The mass resolving power of a time-of-flight mass spectrometer also depends on the length of the flight path. If the physical size of a mass spectrometer is limited, one can also convolute the ion beam in the time-of-flight mass spectrometer a number of times. FIGS. 2 and 3 depict such spectrometers with convoluted ion beams. It is virtually impossible to make such mass spectrometers powerful by using grids, that is, with conventional technology, because the many grid passages reduce the strength of the beam and cause the cross section of the beam to become larger and larger, if only due to small-angle scatter.

FIG. 2 shows a mass spectrometer where the band-shaped ion beam is convoluted in the z-direction. It is useful to bend the band-shaped ion beam entirely in the y-direction by means of an electric capacitor field (13) so that the band-shaped ion beam is convoluted exactly above or below. In U.S. Pat. No. 5,986,258 (Melvin Park) a capacitor comprised of several bipolar capacitor disks ("extended Bradbury-Nielsen gate") has become known with which such bending of the ion beam can be performed perpendicular to its band.

FIG. 3 shows a mass spectrometer where the band-shaped ion beam is convoluted in a zig-zag shape in the x-y plane.

If one wishes to use single-stage reflectors (or two-stage ones with a relatively long deceleration field, which also cause divergence in the z-direction) despite the known disadvantages, it is advisable to place a cylindrical lens in front of each reflector. However, this detracts from the advantage of only having to generate a single adjustable voltage for the single-stage reflectors.

The slit diaphragms generally have to be longer than the width of the band-shaped ion beam. The marginal beams should pass through at least three slit widths away from the end of the slits, and a distance of five slit widths is better. Nevertheless, marginal adjustments are also possible by slightly widening the slits toward their ends, for example with a circular aperture at the end with a diameter which is slightly larger than the slit width.

For the beam from the pulser it is favorable to peel away the marginal areas upon entry into the drift section, on account of the distortion of the ion guide at the end of the outpulsing slits.

Naturally one can also apply the basic principles of this invention to the design of a linear time-of-flight mass spectrometer. Linear time-of-flight mass spectrometers are ones without a reflector. A two-stage pulser makes it possible to generate a temporal focus either for ions having a different initial velocity or for ions with different starting points but each with the same mass. In conjunction with a cylindrical lens which also provides a spatial focus, one can therefore design quite a good linear mass spectrometer which makes do with a narrow detector having a small total area and therefore low noise. However, in the past it has become apparent that linear mass spectrometers with orthogonal ion injection are not particularly popular, probably because for this apparatus the emphasis is on determining the precise masses of the ions, which can be better achieved with a reflector-type time-of-flight mass spectrometer.

Time-of-flight mass spectrometer technology is now highly sophisticated: about a dozen companies have time-of-flight mass spectrometers on the market; experts in the field of time-of-flight mass spectrometer development have a broad range of knowledge. It is therefore surprising to hear again and again from specialists that gridless time-of-flight mass spectrometers have insurmountable disadvantages due to the inevitable smearing of the times of flight. That can be the only reason why there are so few grid-free time-of-flight mass spectrometers on the market nowadays. Since the few grid-free spectrometers in existence produce excellent performance, this argument is clearly incorrect.

With the basic principles indicated in this invention any specialist in the field should be able to develop gridless time-of-flight mass spectrometers. No precise dimensions for such spectrometers are given here, for example, length of flight, slit width, or other geometric and electrical variables. The reason is that the size of the spectrometers and the details of the voltages used depend entirely on the analytical task and other boundary conditions. However, there are sufficient simulation programs for spherical and cylindrical ion lenses on the market which make it possible to determine the optimal parameters in detail for a set of boundary conditions. Any specialist can handle such programs. With the basic ideas of this invention and with the aid of such programs (or with the aid of other known methods of computation) the specialist can easily calculate the optimal configuration in his particular case.

What is claimed is:

1. A time-of-flight mass spectrometer with injection of a narrowly defined ion beam having ions which fly in a direction parallel to an axis x, the spectrometer comprising:

a pulser which accelerates, in pulses, a segment of the ion beam with a gridless slit diaphragm that extends parallel to the x-axis, the acceleration being parallel to an axis y that is perpendicular to the x-axis so that the accelerated ions form a band-shaped ion beam;

at least one electrical reflector that receives the ion beam from the pulser and accelerates it with a gridless slit diaphragm that extends in the x-direction, the reflector acceleration being in a direction opposite to the acceleration provided by the pulser; and a detector that receives the reflected ion beam from the reflector and provides temporally resolved measurement of the ion beam, wherein the gridless slit diaphragms of the pulser and the reflector provide focusing of the ion beam on the detector in a direction parallel to an axis z that is perpendicular to both the x-axis and the y-axis.

2. A time-of-flight mass spectrometer according to claim 1, wherein the spectrometer includes at least one two-stage reflector with two slit diaphragms, one short deceleration field and one reflection field that contribute to said ion beam focusing.

3. A time-of-flight mass spectrometer according to claim 1, further comprising at least one cylindrical lens that extends parallel to the x-axis and contributes to said focusing of the band-shaped ion beam.

4. A time-of-flight mass spectrometer according to claim 3, wherein the spectrometer comprises at least one cylindrical Einzel lens made up of two outer slit diaphragms at ambient potential and one inner slit diaphragm at a lens potential.

5. A time-of-flight mass spectrometer according to claim 4, wherein only one cylindrical Einzel lens is used which is positioned very close to the pulser, such that in a boundary case of diminishing distance the pulser and cylindrical Einzel lens have a common slit diaphragm.

6. A time-of-flight mass spectrometer according to claim 4, wherein the cylindrical Einzel lens has an inner slit diaphragm with two jaws that can be connected to slightly different potentials for adjusting the direction of the band-shaped ion beam in the z-direction.

7. A time-of-flight mass spectrometer according to claim 1, wherein the pulser has two slit diaphragm electrodes and one repeller electrode, of which only the repeller electrode, the first slit diaphragm or both together are used for pulsing the ions located between the repeller electrode and the first slit diaphragm by means of voltage changes, while there is constant potential at the second slit diaphragm.

8. A time-of-flight mass spectrometer according to claim 1, wherein at least two reflectors are used which are slightly rotated round the x-axis, so that the ion beam is slightly reflected out of the x-y plane in the z-direction forming a zig-zag beam in the projection onto a y-z plane.

9. A time-of-flight mass spectrometer according to claim 8, further comprising an electrical capacitor that generates a capacitor field parallel to the x-axis and that deflects the band-shaped ion beam in a direction parallel to the y-axis after it leaves the pulsar.

* * * * *